Patented Dec. 31, 1935

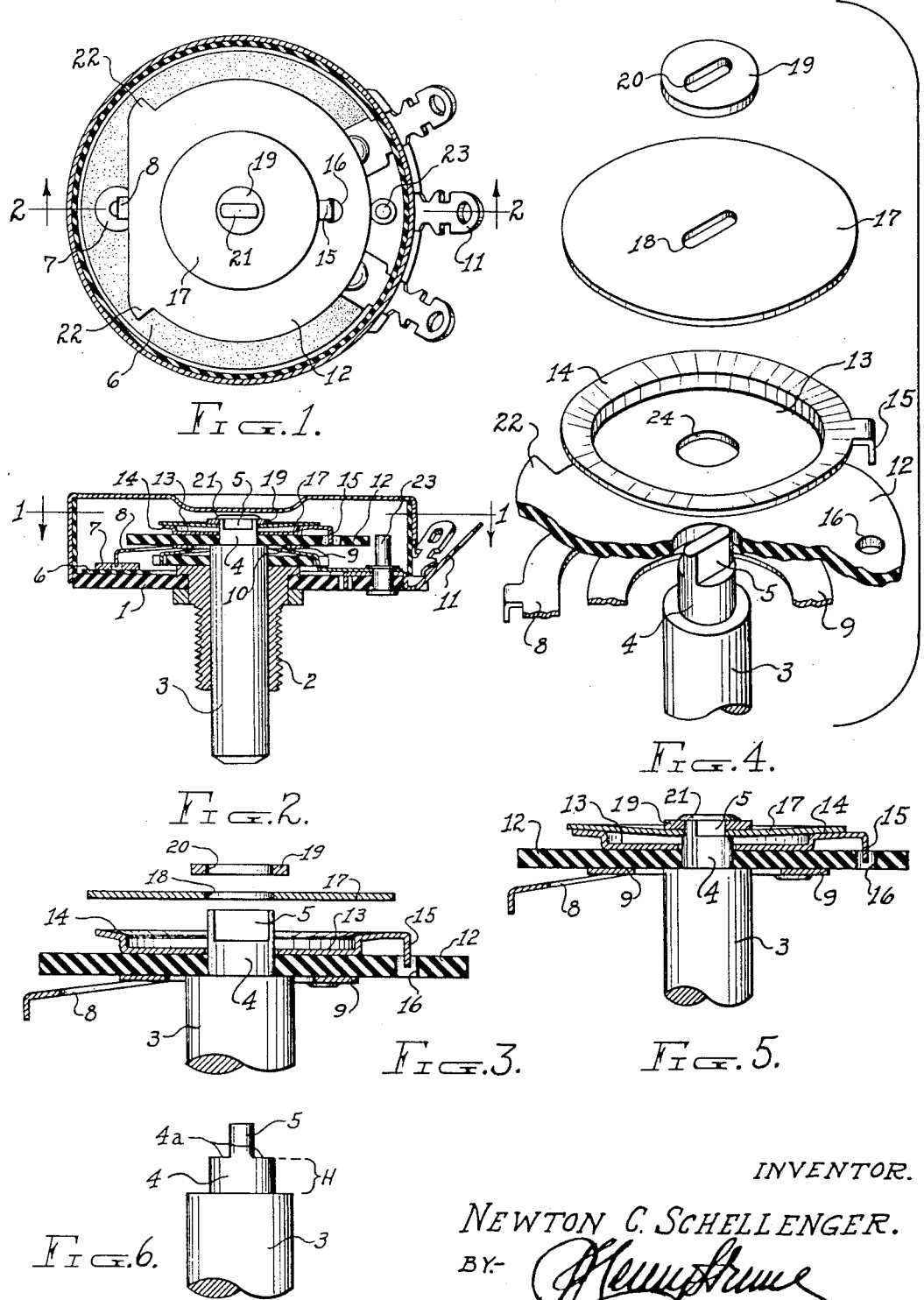

2,025,831

UNITED STATES PATENT OFFICE 2,025,831

FRICTIONAL COUPLING FOR CIRCUIT CONTROLLERS

Newton C. Schellenger, Elkhart, Ind., assignor to Chicago Telephone Supply Co., Elkhart, Ind., a corporation of Indiana Application October 22, 1934, Serial No. 749,323

2 Claims. (Cl. 64—30)

My invention relates to electric or radio circuit controllers, and more particularly to an improved means for transmitting power from the actuating drive shaft to the driven parts thereof.

There are many instances where circuit controllers are incorporated in devices wherein other instrumentalities of the devices are assembled in close proximity to such controllers to provide a compact assembly. This is particularly true in the present day radio receiving sets, which require that each device of a set occupy an alloted space in the assembly to which its physical shape can best conform. Such assembly results in each device, when secured in place, being rendered substantially immovable in most, if not all, directions.

In radio sets, the component parts thereof are mounted on chassis or frames in the above described manner, which frames are placed in suitable cabinets or receptacles. These cabinets are provided with apertures through which control shafts of the sets may extend; such apertures usually being encompassed by suitable markings, indexing scales, or other dial calibrations.

These markings are fixed at some predetermined position, so that when a controller handle or knob with a suitable pointer or indicating means, is secured to a shaft, the position of the mechanism of the particular control device from which the shaft extends may be ascertained.

Many of the present day receivers are provided with control shafts, the ends of which are shaped to receive the control knobs or dials in one position only; not permitting of any slip adjustment, if required, between the shaft end and the knob whereby the position of the mechanism of a control device may be truly represented on the scale adjacent the shaft aperture by the indicator on the knob.

In the construction of radio sets, it is rarely possible, without materially increasing manufacturing costs, to assemble the component parts of a set on a chassis in fixed positions; dispose the chassis rigidly within a cabinet, then, have an unadjustable knob of a control on such chassis to properly indicate the adjustment of the control on a scale immovably secured to the cabinet. The reason for this is obviously assigned to the fact that there are necessarily many minute inaccuracies, both in the formation of parts and in the mounting thereof, which combine to improperly position the control device and its indicator relative to the scale or panel dial markings.

The only ways in which such discrepancies could heretofore be reconciled necessitated the taking down of the sets wherein they occurred, and performing the necessary adjustments, if possible.

There are many places in which radios are used which render such disassembly operations extremely difficult and inconvenient, if not practically impossible. An example of these is the automobile receiver, which, in addition to the other malaligning influences already discussed, introduces the factor incident to controlling the sets remotely, as by flexible cables.

The use of remote control cables, due to lost motion, etc., affords very serious departures between the actual position of the mechanism of a control device and its indicated dial position, whereby undesirable misrepresentations occur that cannot readily be corrected.

It is an object of the present invention to provide circuit controllers of certain types with means whereby any positional differences between their mechanisms and their indicators may be reconciled.

It is another object of my invention to provide a controller wherein such adjustments may be made without disturbing any associated parts in assembly therewith.

It is still another object of my invention to provide a circuit controller, such as a variable resistance device, with a drive coupling means which will yield when forced to permit a lost motion movement between the driving and driven elements thereof.

With the above objects in view and others that will develop as the description proceeds, one preferred embodiment of my invention may be accomplished as follows:

For purposes of illustration, I will describe my invention as applied to a variable resistor, although its application need not be limited to such.

Upon the contactor arm of a variable resistor, or upon any associated structure adapted to rotate therewith, I secure one of the elements of a friction coupling. This element is preferably the outer- or top-most part, or, in order of assembly, the last part associated with the contactor arm assembly to be put in place. It may be fastened to the contactor arm assembly in any suitable manner so as to rotate therewith.

A drive shaft passes through openings in the contactor arm assembly and coupling element so as not to have driving engagement therewith. Secured to the end of the shaft adjacent the coupling element is another coupling element, complementary to the one secured to the contactor arm assembly, and which is firmly pressed into engagement therewith.

When power is applied to rotate the shaft, it is transmitted through the coupling to the contactor arm. However, when the contactor arm is at the end of its movement, and is restrained from further rotation in one direction, but it is found desirable to continue to turn its actuating knob in that direction for purposes discussed hereinbefore, the coupling at the shaft end slips to allow such movement. In this manner any malalignment between the indicator and the variable resistor, causing them to be out of coincidence, can simply and efficaciously be remedied.

The features which I consider characteristic of my invention are set forth with particularity in the appended claims. The invention itself, however, both as to organization and manner of operation, together with the objects and advantages thereof, are more fully set forth in the annexed specification when considered in light of the accompanying drawing, in which:

Fig. 1 is a top plan view of a variable resistor, which embodies the features of my invention; the cover having been sectioned along line 1—1 of Fig. 2.

Fig. 2 is a vertical sectional view taken along line 2—2 of Fig. 1.

Fig. 3 is an exploded detail vertical sectional view of a contactor arm assembly made in accordance with my invention.

Fig. 4 is an exploded perspective view of the contactor arm assembly, illustrated with parts broken away.

Fig. 5 is an assembled sectional view of the devices illustrated in Figs. 3 and 4.

Fig. 6 is a fragmentary side elevational view of the end of the drive shaft, illustrating the various reductions and shoulders formed thereon.

Referring more specifically to the drawing in which like numerals designate like parts:

In Figs. 1 and 2, the variable resistance device to which, for purposes of illustration, the present invention has been added, is the same as that shown and described in my copending application Serial No. 672,955, filed May 26, 1933. It is comprised of a base 1 of insulation, which is apertured at its center to accommodate an externally threaded bearing thimble or bushing 2.

Journalled within the bushing 2 is a drive shaft 3, by means of which a rotary motion is imparted to the movable elements. The shaft is provided with a cylindrical reduced end portion 4, which is flattened at its free extremity on diametrically opposed sides as is designated at 5.

Mounted upon the base 1, is a resistance element 6 of the flat, carbonaceous type, over which a contacting shoe 7 is adapted to ride. The shoe is moved relatively to the resistance element to vary the resistance by means of the contactor arm 8. The arm 8 has a ring 9 formed integrally therewith, which bears upon a brush collector ring 10 to establish electrical connection with terminal 11.

The contactor arm 8 is mounted to rotate with the shaft by means of a drive plate 12 of insulation, which has a circular opening at its center for mounting upon the cylindrical reduced end portion 4 of the shaft 3. It has been customary heretofore to shape the opening in the drive plate to receive the flattened portion of the shaft, whereby a driving connection could be effected between them. However, in the present invention, it is expressly provided that there shall be no direct driving connection between the drive plate 12 and the shaft 3 at this point. The cylindrical reduced end portion 4 is adapted to rotate freely within the round opening in the drive plate 12, entirely independently thereof. The contactor arm 8 is rigidly fastened to the drive plate 12 in any suitable manner; small rivets usually being employed for this purpose.

The driving connection between the shaft and the contactor arm assembly is effected by means of a friction coupling, a preferred embodiment of which is illustrated in the drawing, and it is to this feature that the present invention specifically relates.

One element of the friction coupling is stamped from sheet metal, and is formed as a dish or shallow cup 13 having a relatively wide rim portion 14 slightly conical or flared in shape. This element is provided with a central aperture 24, which is adapted for disposition about the cylindrical reduced end portion 4 of the shaft 3 in the same manner as the drive plate 12, whereby the shaft may rotate therein without transmitting any driving force thereto. The element 13 has a flat bottom portion adapted to lie upon the drive plate 12, and has an outwardly and downwardly extending lug 15 for registration with an aperture 16 in the drive plate. In this manner the drive plate and the coupling element are permitted no rotary movement relative to each other.

A substantially planar metallic disc 17 constitutes the complementary coupling element of the one above described. It is of circular shape and of such a size as to lie upon the element 13 to close it. This disc is preferably made slightly larger in diameter than the element 13, whereby any burred portions about the edges thereof resulting from its manufacture, will not engage said element.

The disc 17 is provided with an elongated aperture 18, which is of the proper size and shape to snugly receive the flattened portion 5 of the drive shaft 3, whereby the disc may be rotated with the shaft.

With reference to Fig. 6, the shoulders 4a form seats for the disc 17, when it is assembled on the shaft. The disc is depressed to engage the shoulders 4a of the shaft 3, and is held in firm engagement therewith by the washer 19 and the flattened shaft end 21. The height of the cylindrical portion 4, designated as H in Fig. 6, will determine the degree of tension to which the disc 17 will be subjected when in place. If the tension is to be great, the height H may be considerably reduced, or if the tension is to be slight, the height H may be increased.

Proper determination of at what height the shoulders 4a should be disposed will result in the correct amount of tension being given the disc against the friction coupling element 14 to provide the desired frictional engagement therewith. Therefore, uniformity of frictional engagement between the elements of the couplings, even in mass production, will always be assured.

A metal washer 19 is positioned upon the disc, and has an opening 20 through which the extreme end of the shaft is adapted to pass. The shaft is sufficiently short to necessitate that the disc 17, which is composed preferably of spring tempered metal, be depressed adjacent its midportion whereby a sufficient amount of shaft is exposed to accommodate the washer 19. With the washer in place, the shaft end is peened over as at 21 to hold the entire assembly firmly together.

It will be observed that the disc 17 is sprung to form a cone, and thereby conforms to the slightly conical shape of the rim portion 14 of the coupling element 13. In this position, it is caused by its own tension to forcibly bear upon the rim portion 14 whereby a strong, yet resilient, frictional engagement is effected.

When the shaft is rotated, the disc 17 is caused to turn with it. This rotary movement is transmitted to the element 13 by virtue of the frictional engagement between the rim 14 and the disc. The rotary motion of the element 13 is imparted to the drive plate 12 through lug 15 and aperture 16. Since the contactor arm is directly secured to the drive plate, it is rotated therewith, whereby the shoe 7 is moved across the resistance element 6 to vary the effective resistance.

The drive plate is provided with projections 22 which are adapted to engage a stop pin 23 that is rigidly fixed to the base, to determine the limits to which the contactor arm assembly may be rotated. When one of the projections 22 abuts the pin 23 the contactor arm assembly is restrained from further movement in that particular direction. If, at this point, it should be found desirable to keep turning the shaft so as to align the dial indicator with the extreme index mark, the friction coupling disc 17 will slip upon the rim portion 14 of the element 13 so as to allow such adjustment. The element 13 is held stationary by the drive plate, and the shaft rotates through it without subjecting it to any driving force. By rotating the contactor arm assembly to the opposite extremity of its movement, an adjustment in the reverse direction may be made in the same manner.

I claim as my invention:

1. In a circuit controller, a driving member and a driven member, a frictional coupling connecting said driving and driven members comprising a concave element secured to said driven member, said driving member extending within said concave member from the bottom thereof, said driving member having a reduced end portion disposed below the rim portions of said concave member, and a flat resilient disc engaging said rim portions adjacent its edges having its central portion depressed to engage the reduced end portion of said shaft, said driving member being connected to said disc to rotate it.

2. In a circuit controller, a driving shaft and a driven plate, a frictional coupling connecting the driving shaft and the driven plate, said coupling comprising a first disc having an upstanding concave rim secured to the driven plate and a second flat resilient disc engaging the concave rim portions of the first disc, the driving shaft being connected to the resilient disc to rotate it, the driving shaft having a shoulder engaging the driven plate and a reduced end portion passing through the plate and first disc, the thrust of the shoulder against the driven plate and the connection of the shaft to the resilient disc serving to depress the center of the resilient disc and cause its edge portions to frictionally engage the rim of the first disc.

NEWTON C. SCHELLENGER.